Patented June 17, 1947

2,422,328

UNITED STATES PATENT OFFICE 2,422,328

GLUCOSIDES AS PLASTICIZERS FOR WATER-SOLUBLE ANIMAL AND VEGETABLE ADHESIVES

Harland H. Young, Chicago, Ill., assignor to Industrial Patents Corporation, Chicago, Ill., a corporation of Delaware No Drawing. Application July 16, 1942,
Serial No. 451,229

7 Claims. (Cl. 106—126)

This invention relates to a method of preparing improved adhesives including adhesives derived from both animal and vegetable sources, and improved plasticized compositions derived from animal glues and gelatins.

Plasticized adhesive materials consist primarily of mixtures of an adhesive base, water and a water soluble plasticizer having a desired hygroscopicity. This type of adhesive has been employed to a wide extent for labeling and box-making purposes. Higher grade flexible adhesives such as high grade flexible glues have been prepared by using glycerine as the plasticizing or flexibilizing material because of its relatively low cost, high hygroscopicity and its property of dissolving glue and gelatin in small quantities of water.

In the manufacture of lower grade adhesives of this type, the inexpensive sugars have been substituted for glycerine, although these sugars are far inferior to glycerine with respect to the plasticizing properties. Other materials which have been used to a limited extent are other polyhydric alcohols such as sorbitol, glycols and polyglycols.

One of the principal objections to the use of sugars such as glucose, sucrose, invert syrups and the like is that the composition when heated for use in commercial gumming machines caramelizes quite readily. These substances do not prevent the adhesive from drying out and forming a hard, brittle film. As is well-known, glycerine under the same circumstances prevents the formation of hard, brittle films. Since most of the adhesive bases consist largely of protein materials, the presence of the aldehyde function in the sugars and inverted sugars has a certain tanning effect upon the proteins and in a relatively short period the protein material is rendered insoluble. Adhesives containing such substances having the aldehyde function remain useable for only a few months. Sugars which do not contain the aldehyde function such as sucrose tend to invert during the manufacture of the flexible adhesive or during the use of this adhesive. As a result of the inversion, these sugars are not satisfactory as substitutes for glycerine.

Plasticized compositions derived from animal glue and gelatin such as plasticized animal glue are not only employed as thin films on paper or other sheet materials employed as labels but also find uses in the preparation of hectograph plates, printing rollers and the like. Diethylene glycol, sorbitol and certain polyhydric substances have been employed to replace glycerine as a plasticizing agent for these purposes. Diethylene glycol contains an ether linkage or function which undoubtedly accounts for the lower solvent powers of aqueous solutions of diethylene glycol for proteins as compared to the solvent powers of analogous aqueous solutions of glycerine. In padding operations, adhesives containing diethylene glycol appear to become quite brittle and the glycol tends to penetrate into the paper edges to a far greater degree than does glycerine. Another disadvantage in using glycols is their tendency to depress the jelly strength of the glue or gelatin composition.

Sorbitol and other similar polyhydric alcohols obtained by the reduction of various sugars has been used with greater success than diethylene glycol. When mixed with glycerine for padding compositions, the mixture is superior to adhesives containing glycerine alone at certain low humidities. Sorbitol and similar polyhydric alcohols do not contain an aldehyde group or function and do not cause a tanning or other action upon the proteins so as to render them insoluble. Sorbitol and similar sugar alcohols have not found an extensive use in this field due to their relatively high cost. Similarly, diethylene glycol has not been employed very extensively to replace glycerine because it depresses jelly strength of animal glue compositions. Under ordinary economic conditions glycerine is the cheapest of these hygroscopic agents.

One of the objects of this invention is to provide a plasticized proteinaceous composition which has all the advantages of proteinaceous compositions plasticized with glycerine.

A further object of this invention is to provide a high grade plasticized proteinaceous composition without the use of glycerine.

Another object of this invention is to provide a flexible adhesive composition which may be employed to adhere surfaces which are normally glued in the presence of added organic solvents which cut the surface coating.

The present invention contemplates the preparation of flexible adhesives containing products derived from aldose sugars by removing or blocking the aldehyde group or function of the aldose sugars. These derivatives of the aldose sugars, particularly glycosides of aldose sugars, possess all of the technical advantages of sorbitol and similar polyhydric alcohols and possess in addition the commercial advantage of being relatively low in cost.

The glycosides of aldose sugars may be prepared by refluxing the aldose sugar in an excess of a primary alcohol in the presence of a mineral acid catalyst. The refluxing operation is preferably carried out in the absence of water or moisture, however, it is not absolutely necessary to eliminate all moisture from the reaction mass. Various methods and certain modifications of the foregoing method have been described in the literature and since the present invention is not concerned with the preparation of the glycosides of aldose sugars, further details regarding their preparation is not given herein.

Aldose sugars from which glycosides may be prepared for the preparation of the improved proteinaceous compositions include apiose, arabinose, galactose, glucose, gulose, lyxose, mannose, rhamnose, ribose, talose, xylose and the like. Of the glycosides of the aldose sugars most commonly known are those derived from glucose which are generally termed glucosides.

The alcohols which are preferably employed in the condensation or refluxing reaction are alcohols belonging to the primary group, that is, those containing a primary alcoholic function —$CH_2OH$. Primary aliphatic alcohols which are satisfactory for the purposes of this invention include, ethyl, propyl, normal butyl, iso butyl, normal amyl, iso amyl, and the like.

The glycosides may be represented by the following general formulas:

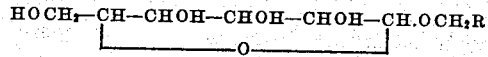

and

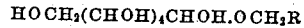

The foregoing formulas represent glycosides derived from glucose. The radical R in these formulas is an alkyl, cycloalkyl or alkaryl group depending upon the alcohol employed during refluxing. Examples of cycloalkyl and alkaryl primary alcohols are cyclopropylcarbinol, cyclobutylcarbinol, phenylcarbinol, hydroxyphenylcarbinol, phenylethyl alcohol, cinnamic alcohol, and the like.

The particular acid employed as the catalyst is a matter of choice. Nitric, sulphuric, hydrochloric and phosphoric acids have been found satisfactory in varying degrees. Anhydrous hydrogen chloride is preferred.

A characteristic of glycosides is that they may be hydrolyzed into the component sugar and primary alcohol. This possible hydrolysis whereby the aldose sugar might be set free and thereby subject the protein material to the action of an aldehyde function is not a serious problem in my compositions. The proteinaceous compositions prepared in accordance with this invention are not subjected to conditions whereby hydrolysis is sufficiently great or severe to result in any appreciable breakdown of the glycosides into the component sugar and alcohol.

Certain organic solvents, for example, lacquer solvents, ethyl acetate, amyl acetate, diacetone alcohol, acetone and the like have been employed in the preparation and use of flexible glue compositions. These substances are employed to cut the surface coatings on surfaces which are to be adhered and which could not be adhered by the use of a normal aqueous or water suspension or solution of glue or vegetable adhesive. These substances have met with a fair degree of success, however, the odor, inflammability and explosive properties of these solvents render them highly objectionable. Resort to the use of these materials has been made generally only in extreme instances.

I have discovered that adhesive compositions containing glycosides derived from aldose sugars and higher primary alcohols may be employed without the use of any of the usual solvents or cutting agents. These glycosides derived from higher primary alcohols, for example, alcohols containing from two up to about eight carbon atoms such as capryl, caprylyl, caproyl, and the like, contain the carbon chain which is characteristic of the particular alcohol and this carbon chain appears to impart the unusual solvent properties to the composition. Such glycosides may function not only as flexibilizing or plasticizing agents but also function as solvents or cutting agents thereby rendering the additional substances either unnecessary or necessary in greatly reduced quantities.

The amount or quantity of plasticizing agent which is incorporated into a proteinaceous composition may be varied over a considerable range depending upon the particular proteinaceous base and upon the properties desired in the final composition. The amount will also be dependent upon the properties and nature of the particular plasticizing agent.

An animal glue may be prepared by incorporating in the glue solution up to about 80 per cent glycosides, based upon the weight of the glue, for example, glyocsides derived from galactose or glucose and ethyl and propyl alcohols. The solution may then be dried in any desired manner and the dried material marketed in such form. If desired, the glue liquor or solution may be concentrated to the desired solids content and the plasticizing agent added to the liquor and the liquor marketed in liquid form.

A liquid animal glue composition, that is, a composition which has the property of existing in a liquid state at ordinary temperatures and of being hygroscopic when dried, may be prepared by increasing the proportion of plasticizing agent. Such compositions are particularly satisfactory as labeling and laminating adhesives.

The so-called flexible glues find particular use in book binding, lamination of various types of fibrous materials and in the manufacture of printer rollers and the like. For such purposes it is desired that the glue product remain in a somewhat rubbery, tough and plastic condition. It is usual in these types of compositions to incorporate a preservative such as a phenolic compound, for example, naphthols, phenols and chlorophenols, and perfumes such as balsam, pine, citrene, citronella, and the like.

In the manufacture of printer rollers and like articles, the dry glue, plasticizing agent, preservative and perfume are heated and thoroughly mixed and cast into the desired form. In the preparation of such products, up to about 150 per cent glycosides, based upon the weight of the glue, may be employed.

In the preparation of liquid glues, various substances have been employed to render the glue capable of existing in a liquid state at ordinary room temperatures. For example, in United States Patent No. 1,950,483, there is disclosed a method of preparing a liquid glue product by adding at least 20 per cent urea or urea derivatives to the animal glue. The addition of up to about 20 per cent glycosides to said composition, based upon the weight of the glue solids, materially increases the flexibility of the dried glue product. In some instances, greater proportions of the glycoside may be desired, however, the proportion should not be increased to such an extent as to materially retard the setting and drying of the composition.

Similarly, vegetable adhesive compositions may be prepared from vegetable raw materials consisting of vegetable materials having a carbohydrate base such as dextrines, starches, flours and other carbohydrate adhesive bases of vegetable origin such as certain gums and sugars. This class of materials is generally termed amylaceous vegetable adhesives and includes such materials as highly converted low viscosity dextrines which, because of their tendency to crystallize, are not ordinarily suitable for labeling purposes. Satisfactory adhesives may be prepared from this class of adhesive materials by adding from 15 to 60 per cent of the plasticizing agent, based upon the weight of the adhesive, described in this application. As in the case of animal glue compositions, the amount of plasticizing agent employed is dependent upon the specific base material, the specific plasticizing agent and the properties desired in the final product. Adhesives containing the plasticizing agents of this invention when dried form rather tough, pliable films and the adhesive does not crystallize and will not powder off surfaces to which it is attached.

Adhesive compositions may also be prepared from an adhesive base consisting of a mixture of animal glue and vegetable adhesive materials and adding to such mixture a desired amount of plasticizing agent. Such mixed adhesives are particularly suited for the manufacture of gummed sheets or tape. This type of adhesive permits a relatively long storage period without an adverse effect upon the original properties of the adhesive. The proportion of the ingredients of such adhesives may be varied and are governed by the type of adhesive which is desired. For labeling purposes, for example, the maximum limit of the amount of plasticizing agent is an amount which is insufficient to impart hygroscopicity to the dried adhesive. Satisfactory adhesives may comprise from 20 to 90 per cent animal glue, from 2 per cent to 50 per cent vegetable adhesive and from 1 per cent to 30 per cent of a plasticizing agent.

A satisfactory dry mixed adhesive product consists of about 65 per cent animal glue, 25 per cent dextrine and 10 per cent of a glycoside.

A representative formula for a liquid mixed adhesive consists of 35 per cent animal glue, 15 per cent dextrine, 10 per cent glycoside and 40 per cent water.

The term "proteinaceous compositions" is employed herein and in the claims to designate a composition derived from a protein base including gelatinous material, vegetable adhesive or amylaceous vegetable materials, and mixtures of these substances. The term "gelatinous material" is employed to designate all grades of animal glue and gelatin including those intermediate products commonly known as "low grade glue" and "high grade gelatin."

It is to be understood that the foregoing description and specific examples are not intended as limitations, but are merely illustrative of my invention. Various modifications will suggest themselves to those skilled in the art and may be made without departing from the spirit and scope of this invention.

I claim:

1. An adhesive composition of matter comprising an adhesive selected from the group consisting of water soluble animal and vegetable adhesives and a glucoside of glucose and a primary alcohol containing from two up to about eight carbon atoms, said glucoside being present in sufficient amount to plasticize the adhesive in the composition.

2. An adhesive composition of matter comprising an adhesive selected from the group consisting of water soluble animal and vegetable adhesives and a glucoside of glucose and ethyl alcohol, said glucoside being present in sufficient amount to plasticize the adhesive in the composition.

3. An adhesive composition of matter comprising an adhesive selected from the group consisting of water soluble animal and vegetable adhesives and a glucoside of glucose and a propyl alcohol, said glucoside being present in sufficient amount to plasticize the adhesive in the composition.

4. An adhesive composition of matter comprising an adhesive selected from the group consisting of water soluble animal and vegetable adhesives and a glucoside of glucose and a butyl alcohol, said glucoside being present in sufficient amount to plasticize the adhesive in the composition.

5. An adhesive composition comprising animal glue and a glucoside of glucose and a primary alcohol containing from two up to about eight carbon atoms, the amount of the glucoside being sufficient to plasticize the glue and ranging up to about 80 per cent by weight of the glue.

6. An adhesive composition comprising a vegetable adhesive and about 15 to 60 per cent by weight of a glucoside of glucose and a primary alcohol containing from two to about eight carbon atoms.

7. An adhesive composition comprising about 20 to 90 per cent of animal glue, about 2 to 50 per cent of a water soluble vegetable adhesive, and about 1 to 30 per cent of a glucoside of glucose and a primary alcohol containing from two up to about eight carbon atoms.

HARLAND H. YOUNG.

REFERENCES CITED

The following references are of record in the file of this patent:

UNITED STATES PATENTS

| Number | Name | Date |
|--------|------|------|
| 2,258,168 | White | Oct. 7, 1941 |
| 2,235,788 | White | Mar. 18, 1941 |
| 2,235,784 | White | Mar. 18, 1941 |
| 2,049,758 | Bertsch et al | Aug. 4, 1936 |
| 1,844,679 | Price | Feb. 9, 1932 |
| 2,322,736 | Pike et al. | June 22, 1943 |
| 2,146,873 | Willmanns et al. | Feb. 14, 1939 |
| 2,390,507 | Cantor | Dec. 11, 1945 |
| 2,037,740 | Salzberg | Apr. 21, 1936 |